H. S. BERGEN.
SHOCK ABSORBER FOR VEHICLES.
APPLICATION FILED SEPT. 2, 1910.
1,011,311.
Patented Dec. 12, 1911.
3 SHEETS—SHEET 2.
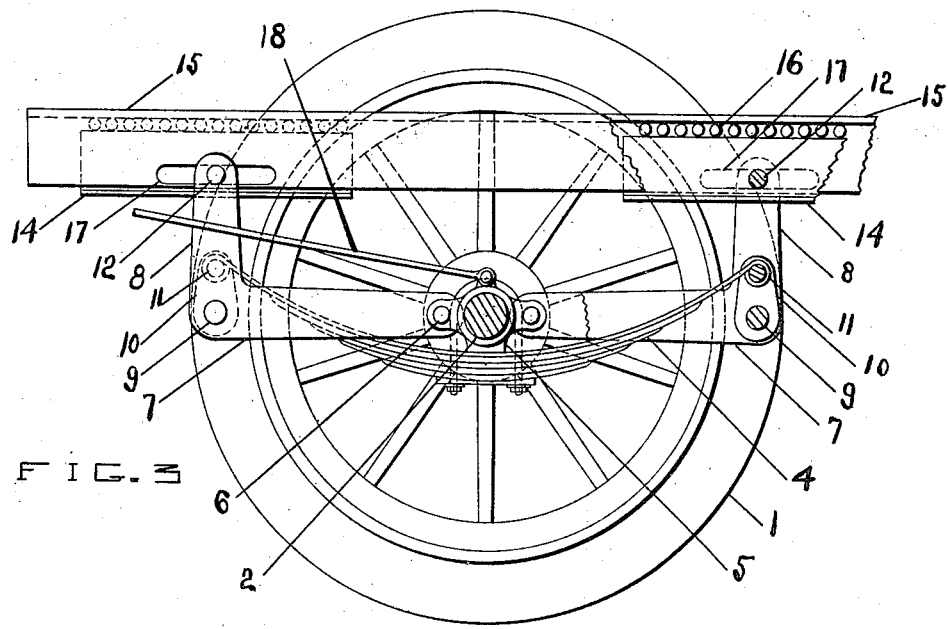
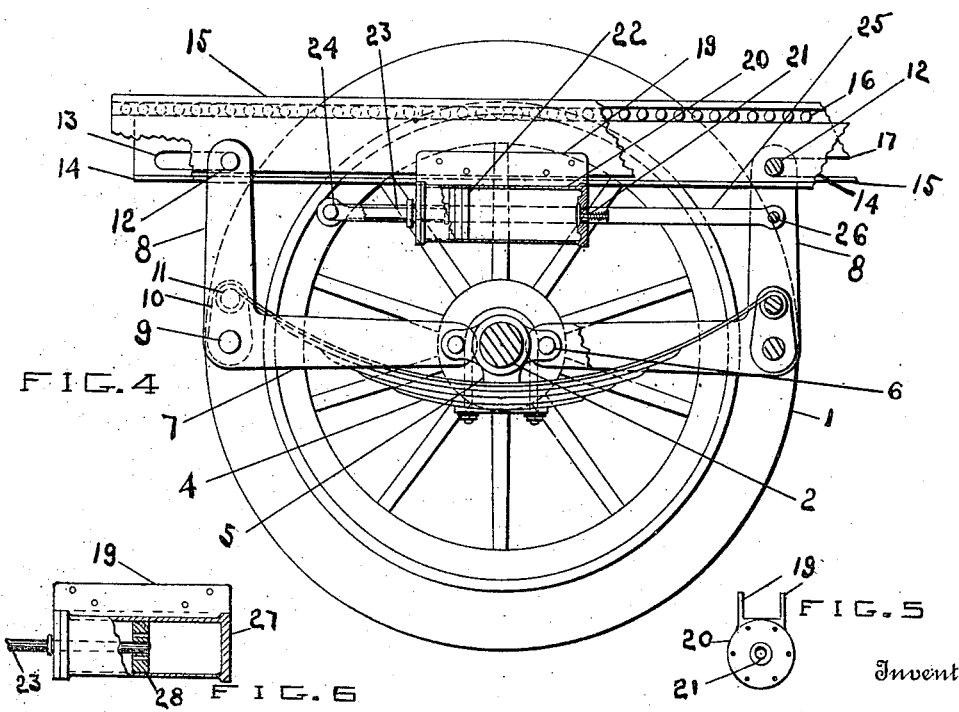

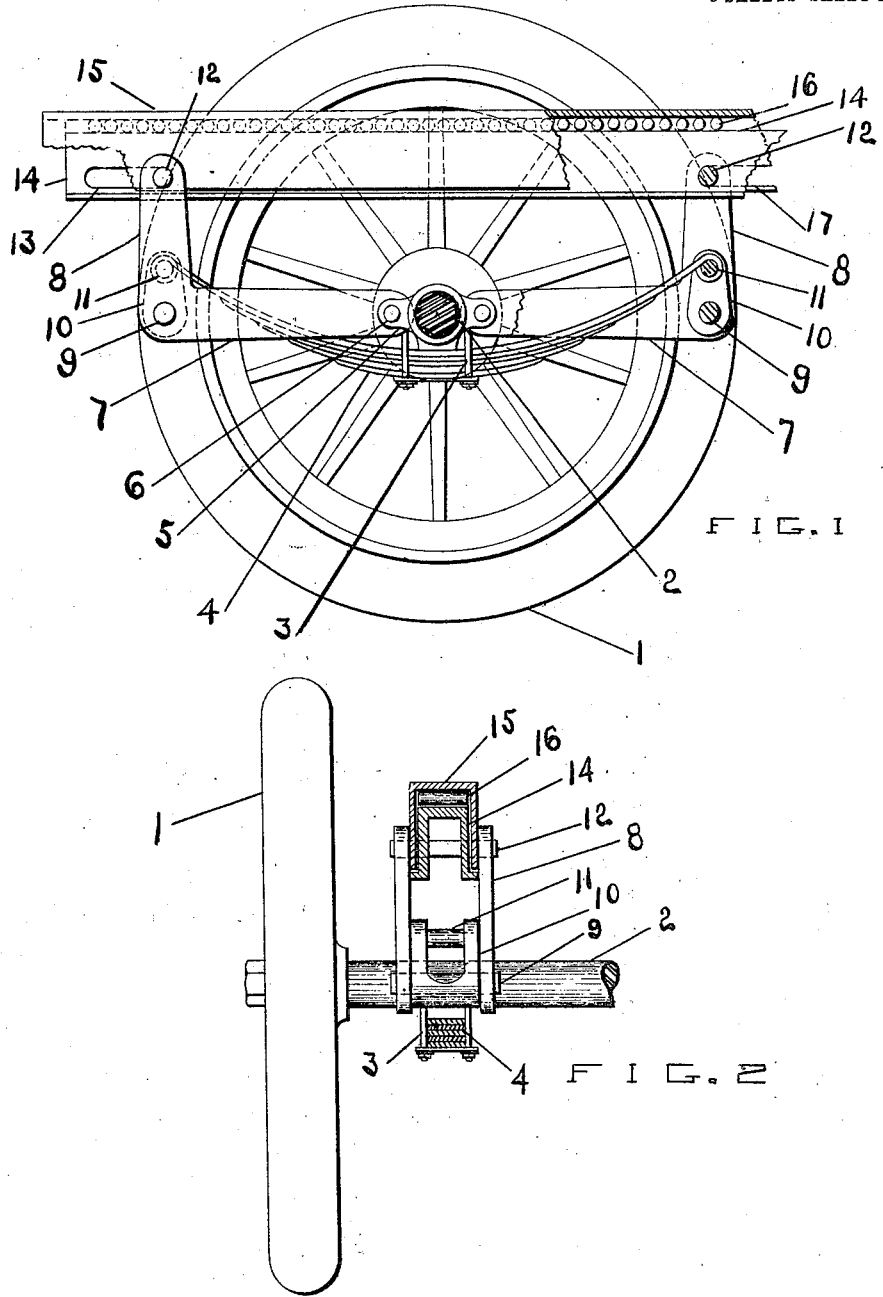

H. S. BERGEN.
SHOCK ABSORBER FOR VEHICLES.
APPLICATION FILED SEPT. 2, 1910.
1,011,311.
Patented Dec. 12, 1911.
3 SHEETS—SHEET 3.
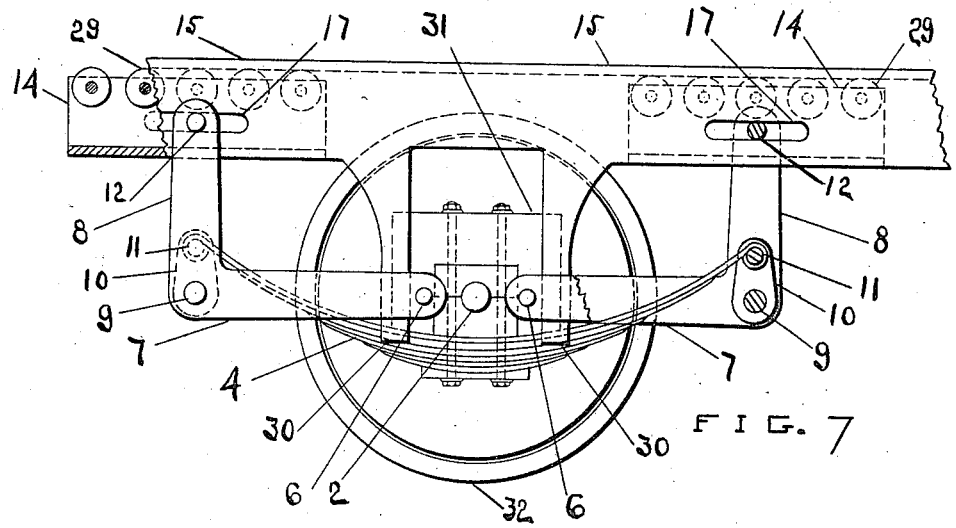
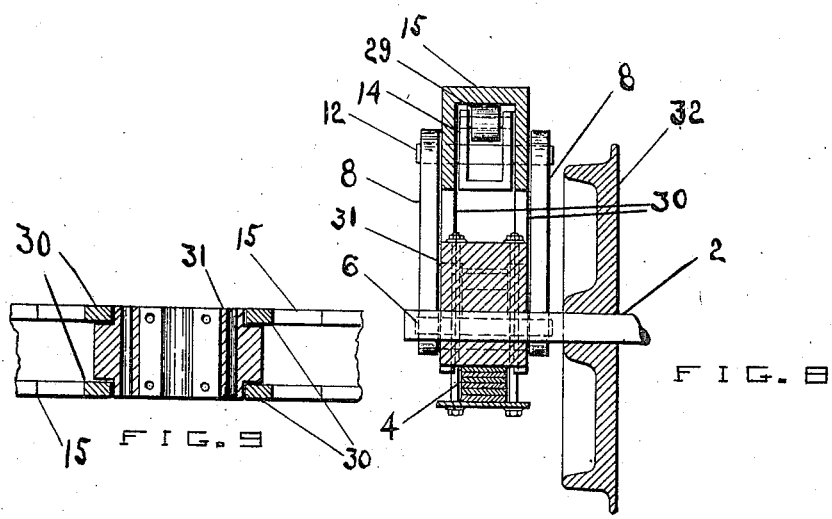
Witnesses
Inventor
Harry S. Bergen
By Geo E Kirk
Attorney

UNITED STATES PATENT OFFICE.

HARRY S. BERGEN, OF TOLEDO, OHIO.

SHOCK-ABSORBER FOR VEHICLES.

1,011,311.      Specification of Letters Patent.    Patented Dec. 12, 1911.

Application filed September 2, 1910. Serial No. 580,210.

*To all whom it may concern:*

Be it known that I, HARRY S. BERGEN, a citizen of the United States, residing at Toledo, Lucas county, Ohio, have invented new and useful Shock-Absorbers for Vehicles, of which the following is a specification.

This invention relates to yieldable mechanism, more particularly as involving elements of vehicle suspension.

This invention has utility when embodied as shock absorbers or supports, especially in vehicle practice.

Referring to the drawings: Figure 1 is a fragmentary view of an embodiment of the invention as adapted to a vehicle of self propelled type, showing wheel in side elevation, a portion of the load carrying frame, and the intermediate connecting mechanism; Fig. 2 is a sectional view of the frame and end view of the device of Fig. 1; Fig. 3 is a view similar to Fig. 1, showing embodiment as adapted to radius bar structure, desirable in caring for power transmission as to rear axles of motor vehicles; Fig. 4 is a view similar to Fig. 1 with an auxiliary retarder or cushion in addition to the spring; Fig. 5 is an end view of the cylinder retarder of Fig. 4; Fig. 6 is a side elevation, with parts broken away of a modified type or cylinder retarder; Fig. 7 is a view similar to Fig. 1, showing embodiment of the invention as adapted to slide-way travel of wheel relatively to the load carrying frame, as adapted to vehicles for travel along rails; Fig. 8 is a medial transverse section of the structure shown in Fig. 7 taken on a vertical plane; and Fig. 9 is a horizontal section through slide way and box of the device of Fig. 7.

The wheel 1 is mounted on the wheel carrying bearing or axle 2. About the carrier or bearing 2 extend the U-bolts 3 to embrace the leaf spring or yieldable means 4. These bolts 3 also maintain the yoke 5 in position. The yoke 5 abuts the spring 4 and thereby the position of the pair of pins 6 carried by the yoke is positively fixed relatively to the spring 4. Engaging each pin 6 is a pair of arms 7 meeting at an angle thereto the arms 8, shown as upwardly extending. The arms 7, 8, are shown integral and as together comprising a member or link. This structure may also be construed as an angle or bell crank lever, having at the junction of the arms 7, 8, the pin 9, which may be construed as a fulcrum for the lever 7, 8. Loosely mounted on the pin 9 is link 10 carrying pin 11 engaging terminus of leaf spring 4. These links 10 serve as equalizers for the spring 4 to distribute elongation thereof as the position of the spring is modified by loads or shocks.

The ends of the links 7, 8, remote from the pins 6, engage pins 12. To the left in Fig. 1, pin 12 is shown as slidable in slot 13 in inner frame section 14, while the pin 12 is fixedly pivoted in the frame section 15, thus allowing of relative movement of the frame section 14 relative to outer frame section 15. To take care of this movement, anti-friction bearing is adopted, shown as embodying the rollers 16 between the frame sections or body members 14, 15 shown as telescoping channels. To the right in Fig. 1, the pin 12 is shown as having fixed pivot mounting in the inner frame section 14, and reciprocable in slots 17 in the channel-shaped outer load carrying frame section 15.

Considering the member 15 as the main frame section, a shock or unusual strain will cause the wheel carrier 2 to swing toward the frame on a radius from the fixed pin 12 in the member 15 described by the arc of the pin 6 as held by the link 7, 8. For this structure, the mounting is preferably such that the fixed pivot mounting of the pin 12 in the frame section 15 is the forward travel side. This lifting of the pin 6, also to an extent lifts the pin 9 toward the frame sections. The spring 4 serves to normally maintain the links 7, 8, in the position shown in Fig. 1. The spring is also effective to so distribute strains that each pin 9 is similarly effected, and each moves an equal distance toward or from the frame sections. Each pin 6 of a pair travels equally. This results in rocking of link 7, 8, at the right in Fig. 1, to equal the rocking of the link 7, 8, at the left in Fig. 1 which latter is spaced from the link at the right. The pins 12 accordingly move away from each other and thus disperse the effect of the shock at an angle to the direction of the acting force, and in a line tending not only not to disturb the carried load, but the link arms and spring may be so proportioned as to fully eliminate up or down movement of the load from shock of similar unusual strains, thereby materially adding to the comfort of passengers, as well as lengthening the life of the vehicle by ridding the structure of injurious vibrations and wear and tear incident thereto.

Instead of but two relatively telescoping frame sections as shown in Figs. 1, 2, 4, the pins 12 may have slotted connection with the main frame section 15, as shown in Figs. 3, 7, with the pins 12 fixedly pivoted in the frame sections 14. As adapted to Fig. 3, such structure confines the movement of wheel carrier 2 to that travel as limited by radius bar 18, instead of the arc of a link 7, 8.

To supplement the resistance of spring 4, additional or auxiliary retarding mechanism may be employed, as shown in Fig. 4. The flanges 19 mount cylinder 20 on a frame section, shown as the outer section 15. The cylinder 20 is shown as provided with valve 21 to control admission of air to the cylinder, as the piston 22 reciprocates. Piston 22 has piston rod 23 connected by pin 24 to link 25, engaging pin 26 in link arm 8. The link arm 8 having the pin 26 is fixedly pivoted to the inner frame section 14 and has its pin 12 slidable as to the section 15 carrying the cylinder 20, so this system brings the full effect of all link travel between the frame sections to bear upon the cylinder dash pot device. For greater dashpot resistance, a closed cylinder, say of the oil type may be provided as shown in Fig. 6. This cylinder 27 is shown with its piston 28 having small oil seepage openings therethrough to more effectively retard travel between piston and cylinder.

While the disclosures of Figs. 1, 3, 4, is more especially adapted for one direction travel, the device of Fig. 7 is such as to act with equal effectiveness in either direction of vehicle travel. Herein, the antifriction bearing is shown as embodying fixedly pivoted rollers 29, instead of floating rollers. The frame section 15 is shown as having rigid guide arms 30, providing a slide way for the block 31 carrying the pins 6 and the wheel carrier 2 for the wheel 32. As concussion or shock causes the spring 4 to give, or the wheel carrier 2 to move, each link 7, 8, rocks similarly.

What is claimed and it is desired to secure by Letters Patent is:

1. A spring suspension for resiliently mounting the body of a vehicle upon an axle comprising the combination with an axle of a pair of oppositely extending bell crank levers, one of the arms of each lever connected to the axle, a spring connected to intermediate portions of each lever and to the axle, and a pair of independently horizontally movable members for sustaining the body as to the axle and to which members the arms of the levers remote from the axle are connected.

2. A suspension for resiliently mounting the body of a vehicle upon an axle comprising the combination with an axle of a pair of oppositely extending bell crank levers, yieldable means coacting to hold the levers in position, one of the arms of each lever connected to the axle, and a pair of independently horizontally movable members for sustaining the body as to the axle and to which members the arms of the levers remote from the axle are connected.

3. A suspension for resiliently mounting the body of a vehicle comprising an axle, two relatively horizontally movable members for sustaining the body, bell crank levers separately extending from the members to the axle, and yieldable holding means for the levers.

4. A suspension for resiliently mounting the body of a vehicle comprising an axle, two relatively horizontally movable members for sustaining the body, a bell crank lever extending from one of the members to the axle, yieldable holding means for the lever, and connecting means from the other member to the axle.

5. A suspension for resiliently mounting the body of a vehicle comprising an axle, two relatively horizontally movable members for sustaining the body, a link extending from one of the members to the axle, yieldable holding means for the link, and connecting means from the other member to the axle.

6. A suspension for resiliently mounting the body of a vehicle comprising an axle, two relatively movable members for sustaining the body, a pair of links extending separately from the members to the axle, and a spring connecting the links.

7. A suspension for resiliently mounting the body of a vehicle comprising an axle, two relatively movable members for sustaining the body, a link extending from one of the members to the axle, a spring for yieldably holding the link, and connecting means from the other member to the axle.

8. A suspension for resiliently mounting the body of a vehicle comprising an axle, two relatively movable members for sustaining the body, links disposed transversely of the axle and extending separately from the members to the axle, and yieldable holding means for positioning the links.

9. A suspension for resiliently mounting the body of a vehicle comprising an axle, two relatively movable members for sustaining the body, a pair of links extending separately from the members to the axle, and primary and secondary yieldable holding means for the links.

10. A suspension for resiliently mounting the body of a vehicle comprising an axle, a body frame provided with a horizontal guide, a link extending from the axle, yieldable holding means for the link, a member movable in the guide to which member the link is connected, and connecting means from the axle to the frame independently of the link.

11. A suspension for resiliently mounting the body of a vehicle comprising an axle, a body frame provided with a horizontal guide, links separately extending from the axle, yieldable holding means for the links, and a member movable in the guide to which one of the links is connected.

12. A suspension for resiliently mounting the body of a vehicle comprising an axle, a body frame provided with a horizontal guide, a member movable in the guide, a pair of links extending respectively from the frame and movable member to the axle, and a spring for connecting the links.

In testimony whereof I affix my signature in the presence of two witnesses.

HARRY S. BERGEN.

Witnesses:
   GEO. E. KIRK,
   GLADYS JAMESON.